United States Patent Office 3,684,706
Patented Aug. 15, 1972

3,684,706
WASTE TREATMENT WITH MICROBIAL NUCLEO-PROTEIN FLOCCULATING AGENT
Ralph A. Bomstein, 3915 Tonkawood Road,
Hopkins, Minn. 55343
No Drawing. Filed Jan. 26, 1971, Ser. No. 109,958
Int. Cl. C02b 1/20
U.S. Cl. 210—47         10 Claims

ABSTRACT OF THE DISCLOSURE

A flocculating agent is disclosed including microbial material which has been alkaline treated such as with sodium hydroxide. The flocculating agent is used to remove suspended organic and/or inorganic waste from water.

BACKGROUND OF THE INVENTION

The present invention relates to waste treatment and more particularly relates to waste treatment using a flocculating agent.

A large number of natural and synthetic materials have been used in the past for flocculation of organic and/or inorganic wastes enabling removal of the waste from water. Examples of natural materials include agar agar, alum, guar gum, glue, gelatin, starch, microbial polysaccharides, and modified cellulose derivatives. Examples of synthetic materials include polyacrylamides, polymethacrylic acid, polyethyleneimine and polyvinylpyrrolidone. The present invention provides an improved flocculating agent, namely, a nucleoprotein sol that is prepared by treating microbial material with an alkaline material.

Typical examples of waste material that may be treated according to the present invention include various suspended inorganic and organic wastes such as those produced by industrial plants, i.e. phosphatic slimes, silica, taconite tailings, soybean wastes, sewage sludge, clay and soil and the like.

It was recently discovered that nucleoprotein material treated with soluble organic or inorganic salts, especially soaps and anionic detergents, may be used as a flocculating agent. In the present invention the flocculating agent is microbial nucleoprotein which has been treated with an alkaline material. Thus, the present invention is particularly advantageous in situations where it is desirable to avoid contamination of the purified water with soap or detergents. For example, water treated according to the present invention has much less tendency to produce foam.

The nucleoprotein material of the present invention is obtained from microbial material capable of being lysed by pH adjustment. As used herein, the term "lysed" means breaking or disintegration of the cell walls such that the cell contents are released. Certain microbial materials are more suitable for such lysing than are other microbial materials. The order Myxobacteriales has been found satisfactory for use in the present invention. Examples of microbial materials that have been used in the present invention include *Polyangium velatum*, *Myxococcus xanthus*, Sorangiaceae such as *Sorangium* S-495, *Bacillus megaterium* KM, *Leuconostoc mesenteroides* NRRL B-512, *Flavobacterium* sp., ATCC 21044, *Micrococcus halodenitrificans* ATCC 13511, Alcaligenes X-300 and Alcaligenes N-131.

The microbial material may be grown using conventional techniques. For example, the microbial material may be grown in any convenient medium containing an organic nitrogen source, inorganic phosphate, a carbon energy source, and accessory growth factors such as B vitamins. The nitrogen source may be soy whey, yeast extract, yeast cells, fungal mycelium or corn steep liquor. The energy source may be starch, oligosaccharides, monosaccharides, yeast extract, yeast cells, fungal mycelium, amino acids, soy protein or milk protein hydrolysates. The accessory growth factors such as B vitamins may come from the yeast extract, yeast cells or pancreatic digest of soybean.

Microbial material has been grown for the present invention using as a medium an aqueous solution containing 0.5% glucose, 0.5% tryptone, 0.25% yeast extract, 0.1% $Na_2HPO_4$ and 0.1% $NaH_2PO_4$. About 100 milliliters of the medium was placed in a 500 milliliter Erlenmeyer flask and 2.0 milliliters of a suspension from a previously grown microbial culture was added using a sterilized pipette. The flask was then incubated at 29° C. on a rotary shaker for about 18 hours. The flask rotated in a 2 inch circle at 250 r.p.m. The microbial cells may be recovered from the medium by centrifugation. Alternatively, the cells may be lysed in the culture medium.

The microbial material in the present invention may be used in the fresh, hydrated form. However, the microbial material may be treated in various ways for purposes of stabilization, purification and concentration prior to use in the present invention. The material may be heated in order to deactivate enzymes. Where the heating temperatures are high, i.e. 90° C. or above, the treatment times should be short, for example, about 1 to 10 seconds at 104 to 116° C. Where the heating temperatures are below about 90° C., i.e. about 50 to 90° C., the treatment may be carried out for from a few minutes to an hour or more, i.e. about five minutes to 2 hours. It has been found that the heat treatments are effective in extending the useful life of the microbial material and of the resulting flocculating agent. However, care must be exercised to prevent the denaturization of the material. Additionally, the heat treatment does not ordinarily completely deactivate the enzymes.

The microbial material and resulting flocculating agent still may be subject to some deterioration after reasonable storage periods. The microbial material may be further treated with an organic solvent of 1 to about 5 carbon atoms such as acetone, methanol, ethanol or isopropanol and thereby increase the stability of the material. The microbial material may be dispersed in the organic solvent and then recovered such as by decantation. It is preferred to use from about 2 to about 30 volumes of the alcohol based on the volume of the microbial material. From an economic standpoint, the use of about 2 to about 10 volumes is especially preferred. The alcohol may be cold or heated to as high as its boiling point in the case of ethanol, methanol and isopropanol or to about 90° C. in the case of alcohols having boiling points above such temperatures. The microbial material may be concentrated or dehydrated by conventional techniques such as vacuum, drum, tray, freeze drying and the like.

The microbial material may be alkaline treated by dispersing in an aqueous medium which contains, or to which is added, a water soluble, alkaline material. Representative alkaline materials include alkali metal hydroxides such as sodium hydroxide and potassium hydroxide, alkaline earth metal hydroxides such as calcium hydroxide, alkali metal phosphates such as trisodium phosphate, alkali metal tetraborates, alkali metal pyrophosphates, ammonia, triethanolamine, symmetrical trihydroxymethyl aminomethane, quaternary ammonium compounds or any other material that will raise the pH to the point at which the microbial material will lyse and form a sol. The alkaline material will be typically used in an amount sufficient to raise the pH of the dispersion to at least about 10.5 and preferably at least 11.0.

The aqueous medium in which the microbial material is alkaline treated may be plain water or it may be water containing other materials, for example, it may be the water containing the waste material. In other words, the microbial material may be first treated with the alkaline material in water and then added to the waste containing water. Alternatively, the microbial material may be added to the waste containing water and then treated in situ with the alkaline material. The microbial material or flocculating agent is dispersed in the waste containing water in an amount sufficient to produce flocculation of the waste materials. Surprisingly, even very small amounts of the treated microbial material will produce satisfactory flocculation and waste treatment. The microbial nucleoprotein material will generally be added in an amount of an least one part per million (p.p.m.). The overall preferred range is from about 1 to 500 p.p.m. based on the total weight of the waste containing aqueous medium.

Flocculation will take place without further treatment once the sol or treated microbial material is added to the waste containing aqueous medium or the microbial material in the waste is alkaline treated. In some instances improved results may be obtained by neutralizing the sol.

The following examples are for purposes of illustrating the present invention.

EXAMPLE I

A flocculating agent was prepared according to the present invention from Sorangium S–495 culture which had been grown for 16 hours in the previously described glucose-tryptone-yeast extract medium at 29° C. The unwashed cells were suspended by homogenization in water to give a 0.2% microorganism (dry weight) suspension. Five milliliters of the suspension were added to 5 milliliters of a buffer solution. The buffer solution was a 0.1% molar solution of sodium carbonate which had been adjusted to pH of between 11.5 and 12.0 with sodium hydroxide. The flocculating agent was used to remove fine taconite tailings from a water suspension. The taconite suspension was waste obtained from Reserve Mining Company of Silver Bay, Minn. The taconite waste, which contained about 1 to 2% suspended solid matter, was adjusted to a pH of 11.0 by the addition of sodium hydroxide. Ten milliliters of the waste were then placed in a test tube and sufficient flocculating agent was added to provide a final concentration of 5 p.p.m. treated microorganism (dry weight). Large flocs formed and settled to the bottom of the test tube within 30 seconds leaving a clear supernatant.

EXAMPLE II

Example I was repeated except that the flocculating agent was added at a level sufficient to provide a final concentration of 2 p.p.m. of the treated microorganism. Similar results were obtained.

EXAMPLE III

The present invention was used to remove taconite tailings substantially as described in Example I except that the sodium carbonate buffer solution was replaced with the following buffers: Sample III–A used $Na_3PO_4$, Sample III–B used $Na_4P_2O_7$; and Sample III–C used $$Na_2B_4O_7 \cdot 10H_2O$$

In each instance satisfactory flocculation was obtained leaving clear supernatants.

EXAMPLE IV

The present invention was used to remove fine taconite tailings as described in Examples I and III except that the Sorangium S–495 was replaced with Alcaligenes X–300. Similar results were obtained.

EXAMPLE V

The present invention was used to remove phosphate ore from a water suspension. The phosphate ore suspension or simulated phosphate slime was prepared by adding 100 gms. of phosphate ore to 120 ml. of water and stirring the mixture for ten minutes. The resulting mixture was passed through a 325 mesh screen. The suspension was then diluted with 4 parts water and the pH was adjusted to 12. The resulting suspension contained about 30% of suspended solid matter. The waste material was treated with a sol prepared from Sorangium S–495 which had been lysed with sodium hydroxide by raising the pH to 11. About 10 milliliters of the suspension was placed in a test tube and sufficient flocculating agent was added to provide a final concentration of 85 p.p.m. of the lysate. Large flocs formed and settled in about 30 seconds leaving a clear supernatant liquid.

EXAMPLE VI

The present invention was used to remove suspended organic material from sewage. Ten milliliters of sewage obtained from an aerated sludge tank was placed in a test tube and the flocculating agent of the present invention was added. The flocculating agent was prepared by lysing Alcaligenes X–300 with sodium hydroxide. Sufficient flocculating agent was added to the ten milliliters of sewage to provide a final concentration of 50 p.p.m. of lysate. Flocculation occurred with the floc settling in less than 15 seconds leaving a clear supernatant.

EXAMPLE VII

Example VI was substantially repeated except that the sewage sample was adjusted to a pH of 11.5 prior to treatment with the flocculating agent. The flocculating agent was added in an amount sufficient to provide between 15 and 25 p.p.m. of the lysate. Similar results were obtained.

EXAMPLE VIII

A flocculating agent was prepared according to the present invention by dispersing Sorangium S–495 cells in water using a homogenizer of the Potter-Elvehjehm type. Sufficient water was added to the homogeneous suspension to adjust the concentration to 0.2% dry weight of cells. The pH of the suspension was then adjusted to 11.5 using 3 N NaOH. The suspension was permitted to stand for about 10 minutes. The suspension became a viscous sol. The sol was divided into two equal portions A and B. Carbon dioxide gas was passed through portion A using a sparger until a pH of 6.8 was obtained. Portions A and B were permitted to stand for 5 hours at room temperature. The viscosity of portion A remained substantially constant whereas the viscosity of portion B underwent a marked reduction. Portion A was more satisfactory as a flocculating agent.

EXAMPLE IX

A flocculating agent was prepared according to the present invention by dispersing 800 milligrams of Sorangium S–495 cells (dry weight) in 150 milliliters of acetone at room temperature. The cells were filtered and air dried for about 18 hours in the dark. The dried cells were dispersed in 80 milliliters of water and the pH was adjusted to 11.0. The cells lysed within one minute to yield a nearly clear viscous sol. One milliliter of the sol was dispersed in 10 milliliters of the simulated phosphate slime described in Example V. The slime had a pH of 11.0. The flocculation occurred immediately and settling of the flocs was complete within 15 minutes.

The embodiments of the invention in which an exclusive property or privilege is claimed are defined as follows:

1. A method for removing suspended waste from an aqueous medium, said method comprising adding to the aqueous medium a material which is predominantly microbial, said microbial material being treated with a lysing material consisting essentially of alkaline material to break open the microbial cell walls and release the nucleoprotein of the cell, and then flocculating said treated microbial material and waste, said nucleoprotein serving as the flocculating agent.

2. The method of claim 1 wherein the microbial material is treated by raising the pH to at least 10.5.

3. The method of claim 2 wherein the microbial material is alkaline treated to form an aqueous sol prior to being added to the waste containing aqueous medium.

4. The method of claim 2 wherein the microbial material is alkaline treated after addition to the waste containing aqueous medium.

5. The method of claim 1 wherein the microbial material is treated by raising the pH to at least 11.0.

6. The method of claim 1 wherein the microbial material is added to the aqueous medium in an amount of between 1 and 500 p.p.m.

7. The method of claim 1 wherein the microbial material is a member of the order of Myxobacteriales.

8. The method of claim 1 wherein the microbial material is a member of the group consisting of *Polyangium velatum, Myxococcus xanthus*, Sorangium S-495, *Bacillus megaterium* KM, *Leuconostoc mesenteroides* NRRL B-512, *Flavobacterium* sp., ATCC 21044, *Micrococcus halodenitrificans* ATCC 13511, Alcaligenes X-300 and Alcaligenes N-131.

9. The method of claim 1 wherein the alkaline material is sodium hydroxide.

10. The method of claim 1 wherein the pH of the aqueous medium is adjusted to at least 10.5 prior to addition of the microbial material.

References Cited

UNITED STATES PATENTS

| | | | |
|---|---|---|---|
| 3,268,412 | 8/1966 | Champagnat et al. | 195—3 H |
| 3,346,463 | 10/1967 | Goren | 210—54 X |
| 3,208,526 | 9/1965 | Patton et al. | 210—51 X |
| 2,609,328 | 9/1952 | Reed | 195—57 |
| 3,347,688 | 10/1967 | Frankenfeld et al. | 99—2 X |

OTHER REFERENCES

McKinney, R. E., A Fundamental Approach to the Activated Sludge Process, Sewage and Ind. Wastes, vol. 24, March 1952, pp. 280–287 (P.O.S.L.).

Biological Flocculation, McKinney, R. E., article in Biological Treatment of Sewage and Ind. Wastes, vol I, edited by McCabe et al., 1956, pp. 88–100 (P.O.S.L.).

MICHAEL ROGERS, Primary Examiner

U.S. Cl. X.R.

195—57; 210—54

PO-1050
(5/69)

UNITED STATES PATENT OFFICE
CERTIFICATE OF CORRECTION

Patent No. 3,684,706          Dated August 15, 1972

Inventor(s) Ralph A. Bomstein

It is certified that error appears in the above-identified patent and that said Letters Patent are hereby corrected as shown below:

Column 1, line 5, after "Minn. 55343" insert -- assignor to General Mills, Inc. --.

Signed and sealed this 17th day of April 1973.

(SEAL)
Attest:

EDWARD M. FLETCHER, JR.
Attesting Officer

ROBERT GOTTSCHALK
Commissioner of Patents